United States Patent
Gustavsson et al.

(10) Patent No.: US 7,731,645 B2
(45) Date of Patent: Jun. 8, 2010

(54) METHOD FOR FORMING A CONTAINER BLANK INCLUDING A SEAL

(75) Inventors: Per Gustavsson, Bjärred (SE); Bengt Jönsson, Valläkra (SE)

(73) Assignee: Eco Lean Research & Development A/S, Copenhagen (DK)

( * ) Notice: Subject to any disclaimer, the term of this patent is extended or adjusted under 35 U.S.C. 154(b) by 38 days.

(21) Appl. No.: 11/597,375

(22) PCT Filed: Jun. 3, 2005

(86) PCT No.: PCT/SE2005/000845

§ 371 (c)(1),
(2), (4) Date: Nov. 22, 2006

(87) PCT Pub. No.: WO2005/120820

PCT Pub. Date: Dec. 22, 2005

(65) Prior Publication Data

US 2007/0245693 A1      Oct. 25, 2007

(30) Foreign Application Priority Data

Jun. 9, 2004    (SE) .................................. 0401463

(51) Int. Cl.
*B31B 37/60* (2006.01)
(52) U.S. Cl. ...................................... 493/189; 493/209
(58) Field of Classification Search ................ 53/371.2, 53/374.2, 479; 493/189, 209, 267; 156/581
See application file for complete search history.

(56) References Cited

U.S. PATENT DOCUMENTS

| | | | | |
|---|---|---|---|---|
| 2,086,735 A | * | 7/1937 | Neumiller | 493/189 |
| 3,531,906 A | * | 10/1970 | Bjorkengren et al. | 53/479 |
| 3,756,900 A | * | 9/1973 | Michel | 53/374.2 |
| 4,079,662 A | * | 3/1978 | Puccetti et al. | 493/209 |
| 4,534,818 A | * | 8/1985 | Kreager et al. | 156/581 |
| 4,582,555 A | * | 4/1986 | Bower | 156/581 |
| 5,015,223 A | * | 5/1991 | Boeckmann | 156/581 |
| 5,419,801 A | * | 5/1995 | McDonald | 156/581 |
| 5,868,901 A | | 2/1999 | Smith | |

(Continued)

FOREIGN PATENT DOCUMENTS

CH          380364 A         9/1964

(Continued)

*Primary Examiner*—Stephen F Gerrity
(74) *Attorney, Agent, or Firm*—Birch, Stewart, Kolasch & Birch LLP

(57) ABSTRACT

The preset invention relates to a method, use of the method and a device for making a seal in a portion of a material web. The material web includes a first elongate section with a first number of layers of material and a second elongate section with a second number of layers of material, at least one of the layers of material being included in both the first and the second section, the portion having an extent that intersects a transition from the first section to the second section of the material web, the method including connecting, in the portion, opposite surfaces of the layers of material of the material web to each other. The method including forming ridges and valleys in the portion, and orienting the ridges and valleys in such a manner that they have an extent intersecting the transition.

7 Claims, 8 Drawing Sheets

U.S. PATENT DOCUMENTS

| | | |
|---|---|---|
| 6,230,781 B1 | 5/2001 | Smith |
| 6,877,296 B2 * | 4/2005 | Kohl et al. .................. 53/374.2 |
| 7,178,316 B2 * | 2/2007 | Kume et al. ................. 53/374.2 |
| 2002/0170272 A1 | 11/2002 | Cooper et al. |
| 2004/0011007 A1 | 1/2004 | Kohl et al. |

FOREIGN PATENT DOCUMENTS

| | | |
|---|---|---|
| EP | 0 256 791 A2 | 2/1988 |
| EP | 1 127 794 A2 | 8/2001 |
| JP | 03148426 A * | 6/1991 |
| WO | WO-03/042041 A1 | 5/2003 |

* cited by examiner

METHOD FOR FORMING A CONTAINER BLANK INCLUDING A SEAL

FIELD OF THE INVENTION

The present invention relates to a method, use of the method and a device for sealing a web of material.

More specifically, the invention relates to a method for making a seal in a portion of a material web, said material web comprising a first elongate section with a first number of layers of material, and a second elongate section with a second number of layers of material, at least one of said layers of material being included in both the first and the second section, said portion having an extent that intersects a transition from the first section to the second section of the material web, comprising connecting, in said portion, opposite surfaces of the layers of material of the material web to each other, and also use of the method and a device.

BACKGROUND ART

WO99/41155 discloses a device for producing container blanks by interconnecting opposite wall portions of a material web along connecting portions.

The material web comprises two side wall webs which are passed in a parallel opposite relationship along a manufacturing line and, arranged therebetween, a bottom wall web folded in two. The webs are thus joined to form a common web of material and are sealed to each other along said connecting portions by sealing tools which engage the web of material.

It is also possible to let the material web consist of a web which is folded longitudinally in the form of an M. A container blank produced from such a material web will obtain two side walls from the outer lateral portions of the web and a bottom wall from the central portion, folded in two, of the web.

A problem that may arise in said sealing along the connecting portions relates to their reliability. In fact, it has been found that it is difficult to provide a reliable seal in the transition between the areas of the material web which comprise two layers of material and the areas which comprise four layers of material. If the pressure is not sufficient, a duct extended parallel to the transition tends to be formed, which obviously results in the container blank not being liquidproof.

On the other hand, if the pressure is dimensioned so as to prevent the forming of said duct, the pressure must be so high that the bottom wall forming part of the material web is subjected to strain in the form of stretching and/or buckling which may result in breakage.

There is thus a need for a sealing method which eliminates the above-mentioned problems.

SUMMARY OF THE INVENTION

In view of that stated above, the object of the present invention is to provide a method, use of the method and a device which wholly or partly solve the above-mentioned problems.

According to the present invention, a method for making a seal in a portion of a material web of plastic material thus is provided, comprising a first elongate section with a first number of layers of material and a second elongate section with a second number of layers of material. One of said layers of material is included both in the first and in the second section and the portion has an extent which intersects a transition from the first section to the second section of the material web. The method comprises connecting opposite surfaces of the layers of material of the material web to each other in said portion.

The method is characterised by forming ridges and valleys by movement of material in said portion, and orienting said ridges and valleys in such a manner that they have an extent intersecting said transition.

A method is thus provided, which allows the provision of a reliable seal in a portion of a material web, in which portion the material web has a transition from a first number of layers of material to a second number of layers of material.

More specifically, the reliable seal is provided by the forming of said ridges and valleys which intersect the transition and thus prevent the forming of a through duct which extends parallel to the transition from a first side to a second side of the seal.

These ridges and valleys can be provided even at relatively moderate pressures, which means that the reliable seal can be made while the material web is subjected to careful treatment. The ridges are formed by material migrating from the valleys and filling the ridges.

The ridges and valleys also give the advantage that the precision in an optional subsequent punching or cutting operation along the portion of the material web need not be as great as in prior-art technique.

The inventive method can be applied in the packaging industry and comprises the step of letting said seal constitute part of a connecting portion of a container blank. The method may also comprise the step of supplying the layers of material of the material web in the form of two opposite and parallel side wall webs and, arranged therebetween, a bottom wall web folded into a double-walled shape, the container blank obtaining two opposite side walls from said side wall webs and a bottom wall folded in two from said bottom wall web.

It will be appreciated that it is most important in the packaging industry to be able to produce liquidproof container blanks and especially container blanks that do not have a through duct which extends parallel to a transition of the above type from the compartment of the blank to the surroundings and which nevertheless in the manufacturing process is not subjected to careless treatment which could result in an indication or a fracture in the walls of the container blank.

The inventive method may comprise the step of forming said ridges and valleys in connection with the provision of said seal. As a result, the method implies that the valleys and ridges can be provided in a time- and cost-effective manner in the portion of the material web. The method also gives the advantage that the precision of the pressure need not be as great as in prior-art technique, which results in fewer rejects and easier setting of the machine.

In the method according to the present invention, the material web can be supplied in the form of a plastic material.

In the inventive method, each ridge can be given a triangular or cup-shaped cross-section.

The opposite surfaces of the layers of material of the material web can, according to the inventive method, be connected to each other in said portion by a heat-sealing process. In the heat-sealing process, a reliable seal can be obtained in a manner which is effective in terms of time, cost and capacity, especially in the cases where the web is supplied in the form of a plastic material.

According to the present invention, also use of the above-mentioned method is provided in the production of a container blank having two opposite side walls and a bottom wall folded in two. The walls are interconnected along an upper connecting portion, along which the side walls are connected to each other, and a first and a second lower connecting portion, along which the bottom wall is connected to the respective side walls, the first and second lower connecting portion passing into the upper connecting portion in a first and second transition respectively.

Since the inventive method is used to produce container blanks, the above advantages are achieved, which allows the provision of a container blank with a reliable seal in the above-mentioned transition.

Finally, according to the present invention, a device for sealing a portion of a material web of plastic material is provided. The portion has an extent intersecting a transition of the material web, and the material web has a first number of layers of material on a first side of the transition and a second number of layers of material on a second side of the transition. The device comprises a sealing tool with a section, which is engageable with said portion of the material web to connect opposite surfaces of the layers of material of the material web.

The device is characterised in that the section of the sealing tool has at least one recess, which when engaging the section with said portion is arranged to provide, by movement of material, a ridge with an extent that intersects said transition.

The inventive device allows the provision of a reliable seal in said portion of the material web. More specifically, this is achieved by the sealing tool section, which when engaging the material web acts to redistribute material in the material web by the material being allowed to fill the recess. As a result, a ridge will be formed in the material web, said ridge preventing the occurrence of a through duct which extends parallel to the transition. Moreover, the provision of a reliable seal is made possible even when applying relatively moderate pressures, thus ensuring careful treatment of the material web.

In the inventive device, the recess can be triangular or cup-shaped in cross-section.

The section of the device can, according to the invention, have at least one further recess, neighbouring recesses being spaced apart by an intermediate portion with a plane abutment surface. This makes it possible to provide a plurality of adjoining ridges for further improved reliability of said seal.

The inventive device can also be arranged to produce container blanks from a plastic material comprising a binder of polyolefin material and a filler of mineral material.

A number of embodiments of the present invention will be now described for the purpose of exemplification and with reference to the accompanying drawings.

DESCRIPTION OF EMBODIMENTS

Figure 1:
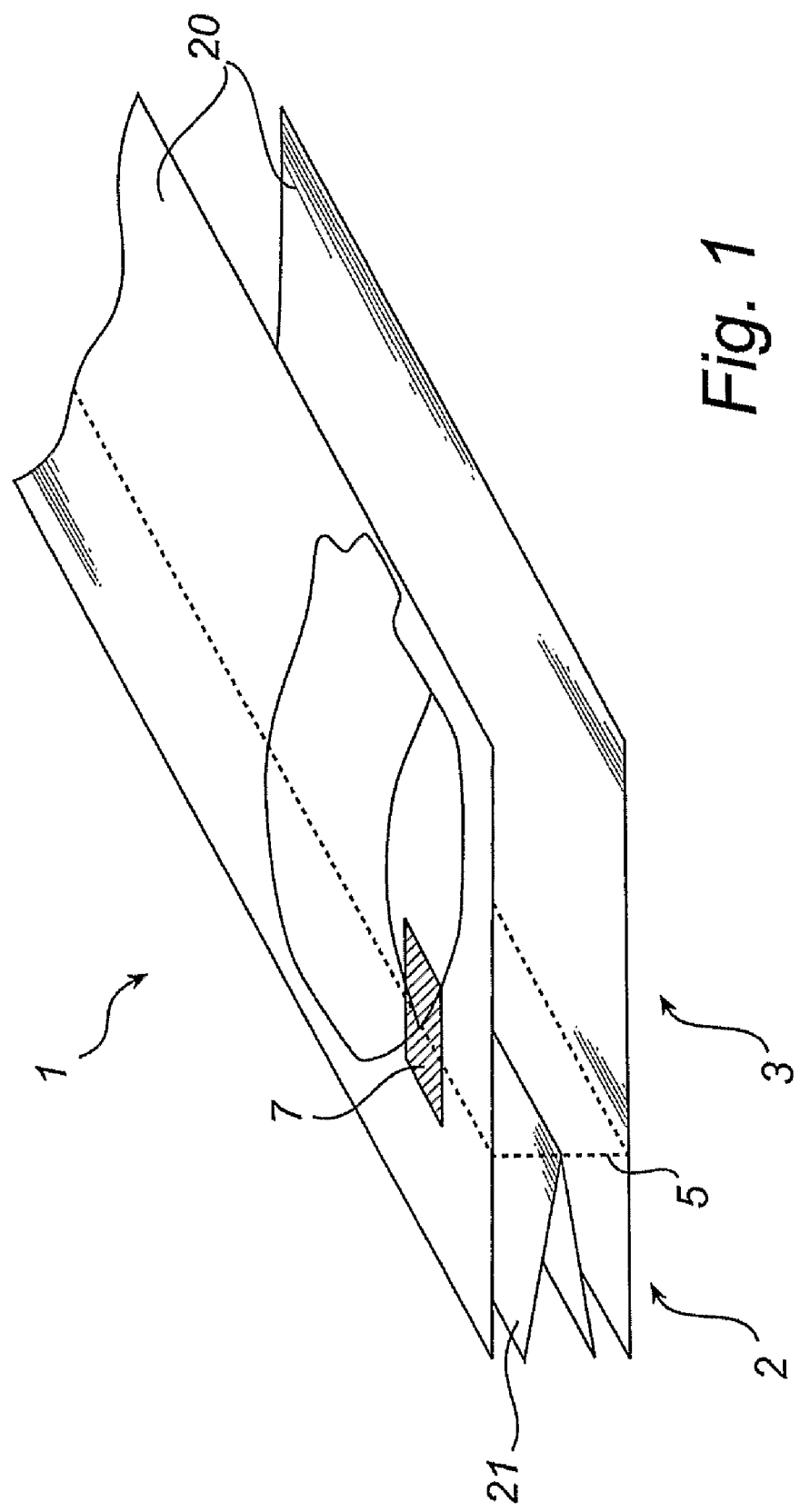
FIG. 1 is a perspective view of a web of material comprising two side wall webs and, arranged therebetween, a bottom wall web folded in two.

FIG. 1, to which reference is made, illustrates a material web 1 comprising a first elongate section 2 with four layers of material and a second elongate section 3 with two layers of material, two of said layers of material being included in both the first and the second section 2, 3. In the embodiment shown in FIG. 1, the layers of material consist of two opposite and parallel side wall webs 20 and, arranged therebetween, a bottom wall web 21 folded into a double-walled shape, the material web 1 having in the transverse direction a transition 5 from the first elongate section 2 comprising said two side wall webs 20 and said bottom wall web 21 to the second elongate section only comprising said side wall webs 20.

In the embodiment shown, the number of layers of material thus changes from two to four in the transition 5.

In conventional production of, for instance, a container blank from a material web 1 of the type shown in FIG. 1, difficulties may arise in making a reliable seal 9 in a portion 7 which has an extent intersecting said transition 5.

Figure 2:
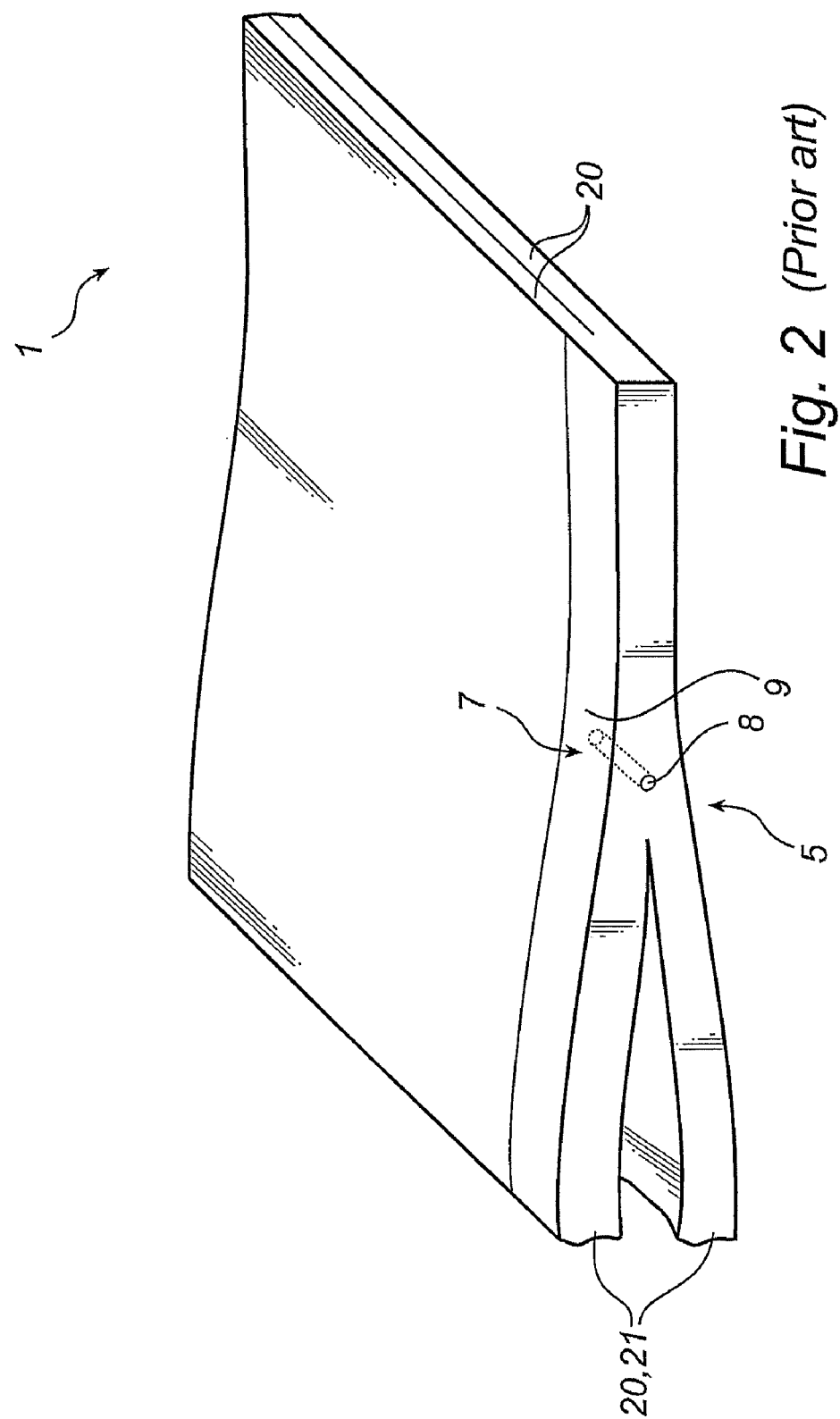
FIG. 2 is a perspective view of a seal in a portion of a material web according to FIG. 1, which seal has been made according to prior-art technique.

This difficulty is illustrated in FIG. 2, to which reference is now also made. This difficulty reveals itself in the forming of a through duct 8 which extends transversely to the seal 9 parallel to the transition 5. For obvious reasons such a duct 8 causes, in the production of container blanks, the container blank to be useless.

The reason for forming said through duct 8 is that a sealing tool (not shown) which is applied to the material web 1 in a portion 7 that intersects said transition 5 will meet a material web 1 of non-uniform thickness. As mentioned above, the forming of the duct 8 can be avoided by applying a sufficiently high pressure, which consequently causes other problems in the form of the material web 1 being subjected to strain in the form of stretching and/or buckling which may result in breakage.

Figure 3:
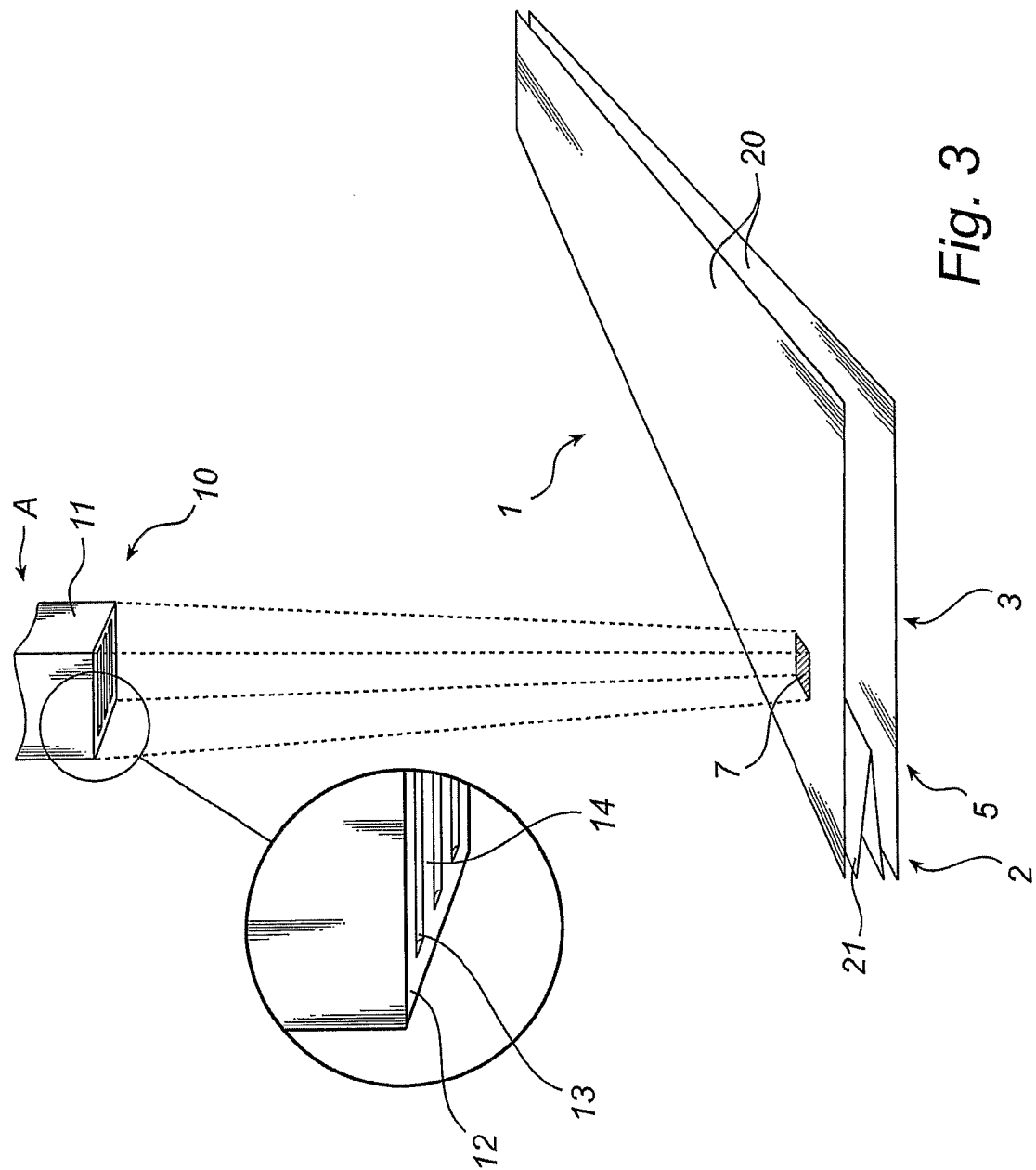
FIGS. 3 and 4 are a perspective view and a cross-sectional view, respectively, which illustrate a method according to the present invention for making a seal in a portion of a material web according to FIG. 1.
Figure 4:
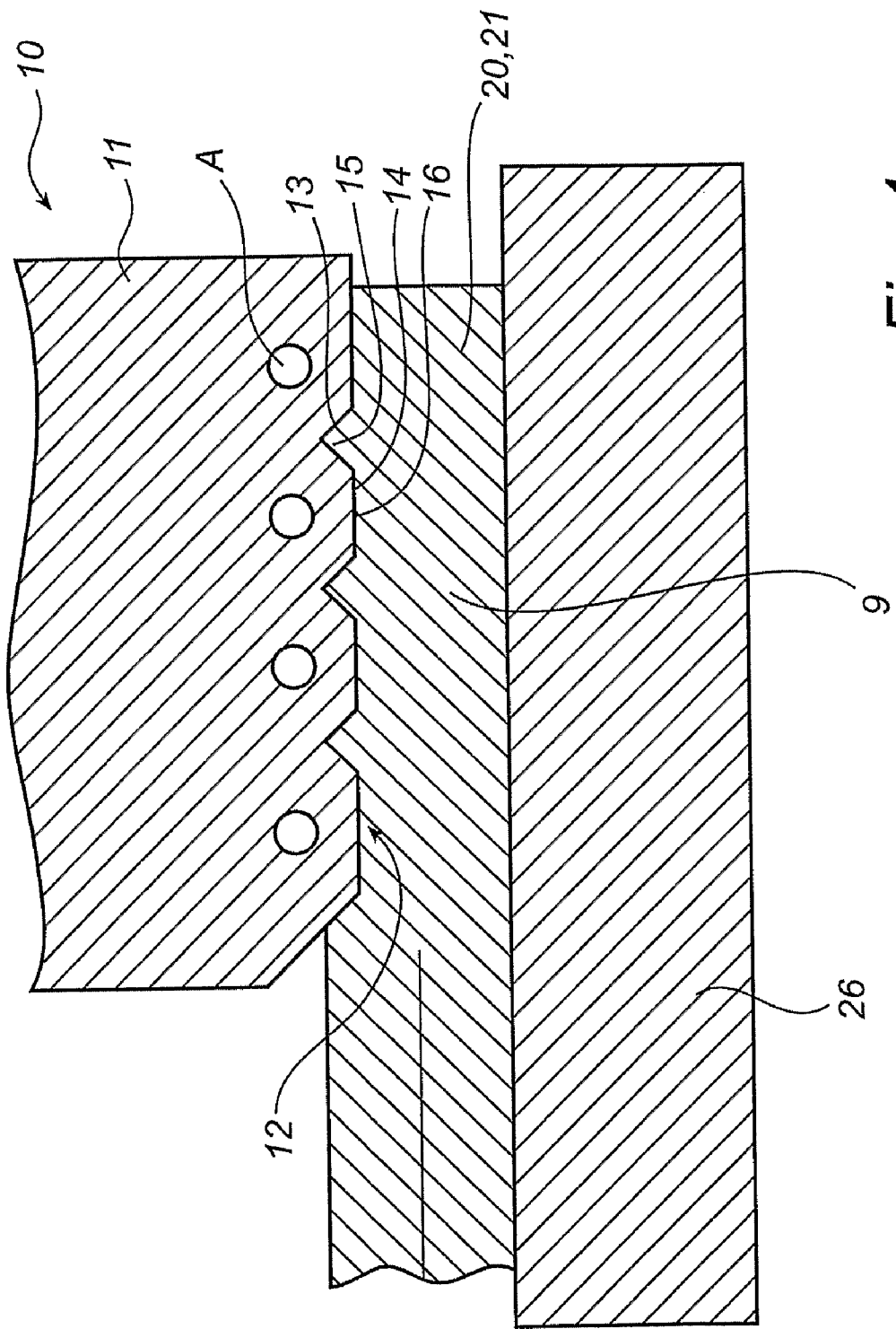

FIGS. 3 and 4, to which reference is now made, illustrate a sealing tool 10 of a device (not shown) for making a seal 9 in a portion 7 of a material web 1.

The device may be included, for instance, in a sealing station in a machine for producing container blanks.

Figure 6:
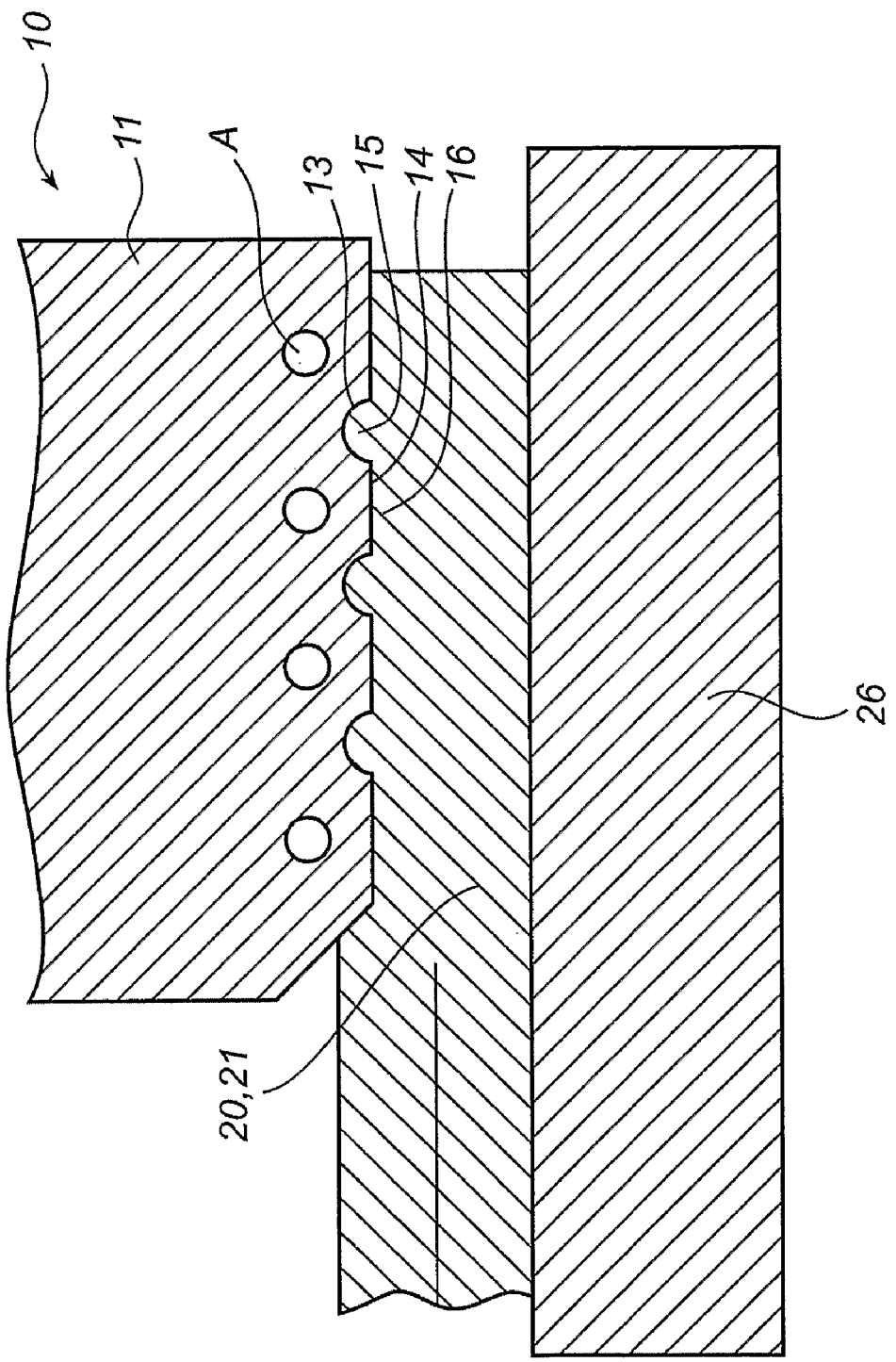
FIG. 6 is a cross-sectional view of an alternative embodiment of an inventive sealing tool.

The sealing tool comprises a body 11 with a lower engaging surface 12. A plurality of parallel recesses 13 are formed in said engaging surface 12, which are triangular in cross-section. The recesses 13 can also, for instance, be cup-shaped in cross-section, which is shown in FIG. 6. The recesses 13 are arranged so that the engaging surface 12 between said recesses 13 has intermediate substantially plane surfaces 14.

In the embodiment shown, the sealing tool 10 also comprises a sealing means indicated at A in the form of a heating means. However, it will be appreciated that the sealing means could be in the form of a means for induction sealing, ultrasonic means or the like.

It should, however, be noted that said heating means, means for induction sealing or ultrasonic means could be arranged somewhere else in the inventive device, for instance in an abutment 26 arranged under the sealing tool 10, as shown in FIGS. 4 and 6.

Said sealing tool 10 is movably arranged in said device for such movement towards the abutment 26 that said engaging surface 12 is moved into engagement with and moved out of engagement from a material web 1 arranged between said sealing tool 10 and said abutment 26.

The method for making a seal 9 in a portion 7 of a material web 1 is schematically shown in FIGS. 3 and 4, to which reference is made once more.

A material web 1 of the type as described above with reference to FIG. 1 is arranged in such a manner between the sealing tool 10 and the abutment 26 that the sealing tool 10 is positioned directly above the portion 7 of the material web 1, which portion 7 has an extent that intersects the transition 5 of the material web 1 from the first to the second section 2, 3. The sealing tool 10 is oriented so that its recesses 13 have an extent that intersects said transition 5.

Subsequently the sealing tool 10 is moved towards the material web 1 and the subjacent abutment 26 for moving the engaging surface 12 of the tool 10 into engagement with the material web 1, which is particularly evident from FIG. 4.

Under the action of the pressure, by which the engaging surface 12 of the sealing tool 10 is applied to the portion 7 of the material web 1, and the heat generated by said heating means, the material positioned in said portion 7 will melt to the necessary extent, whereby opposite surfaces of the layers of material of the material web 1 can be made to be connected to each other. Each layer of material may consist of a laminate material with a melt layer arranged on a surface forming the inside, with a melting point which is lower than the melting point of the other layers included in the laminate material. As a result, it is ensured that only the surfaces that are intended to be connected are actually connected to each other.

The intermediate surface 14 of the engaging surface 12 will in the sealing process act to move the melted material into the space defined by said recesses 13, thereby forming ridges 15 in said portion 7 with intermediate valleys 16 formed of the intermediate surface 14 of the engaging surface 12.

Figure 5:
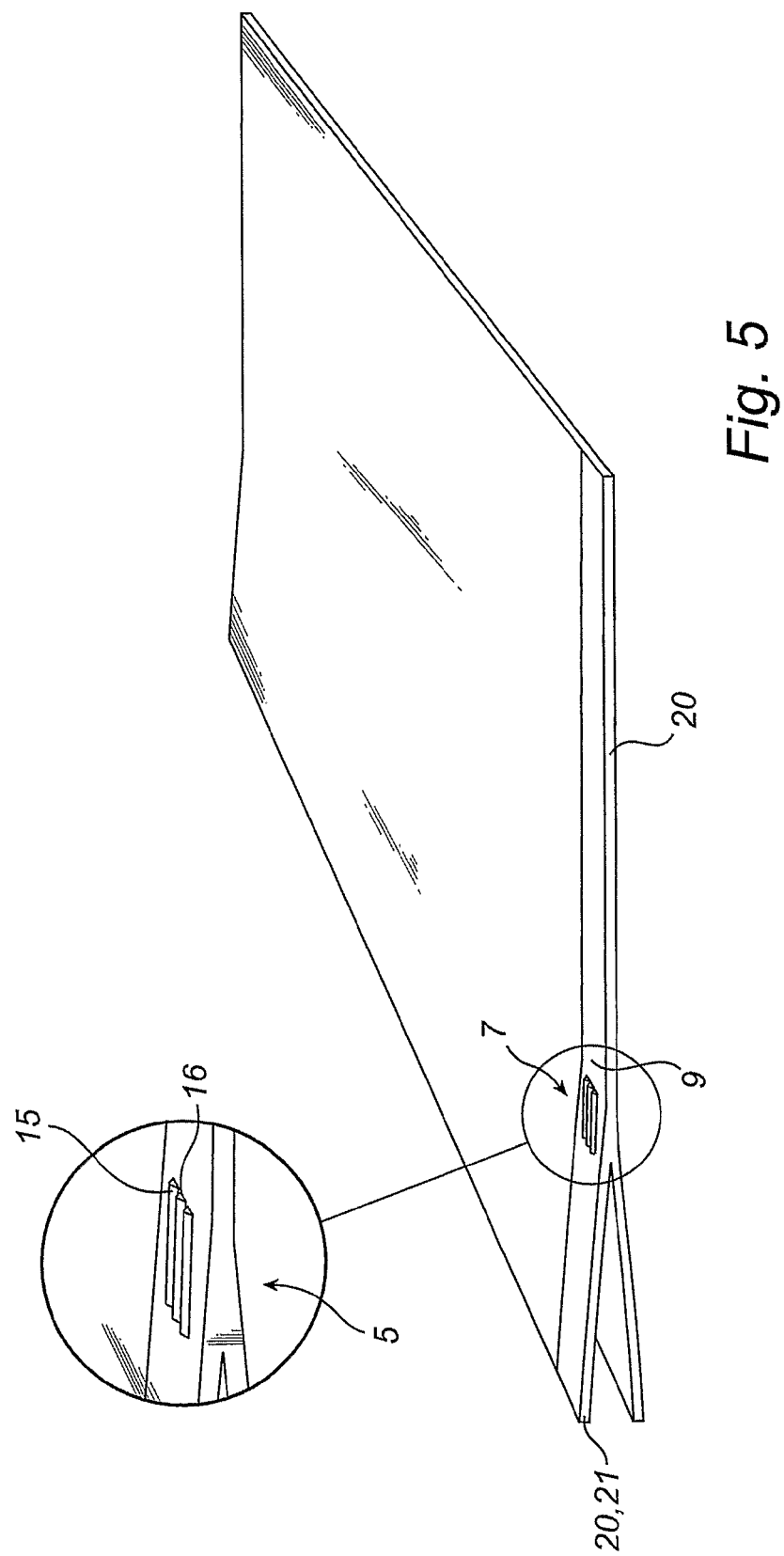
FIG. 5 is a perspective view of a material web with a seal in a portion made according to the method shown in FIGS. 3 and 4.

These ridges 15 and valleys 16 will have the same extent as the recesses 13 and the intermediate surface 14 of the tool 10 and thus have an extent that intersects said transition 5 of the material web 1 from the first to the second section 2, 3. This is shown more distinctly in FIG. 5, in which the seal 9 is shown to be included in a connecting portion along which the side wall webs 20 and the bottom wall web 21 of the material web 1 are connected to each other.

The ridges 15 and the valleys 16 that are extended transversely to said transition 5 and formed even at moderate pressures, will prevent the occurrence of a through duct 8 in the seal 9, as shown in FIG. 2. This is due to the fact that they will either cut off and thus block a possibly formed duct 8 or else completely prevent the occurrence of such a duct.

Thus a device is provided, which renders it possible to make a seal 9 which does not have a through duct 8 extended parallel to the transition 5, while at the same time the layers of material of the material web 1 are subjected to careful treatment. The device also gives the advantage that the precision in a subsequent punching or cutting operation and the precision of the pressure in the sealing need not be as high as in prior-art technique.

It will be appreciated that the present invention is not limited to the embodiments shown.

Figure 7:
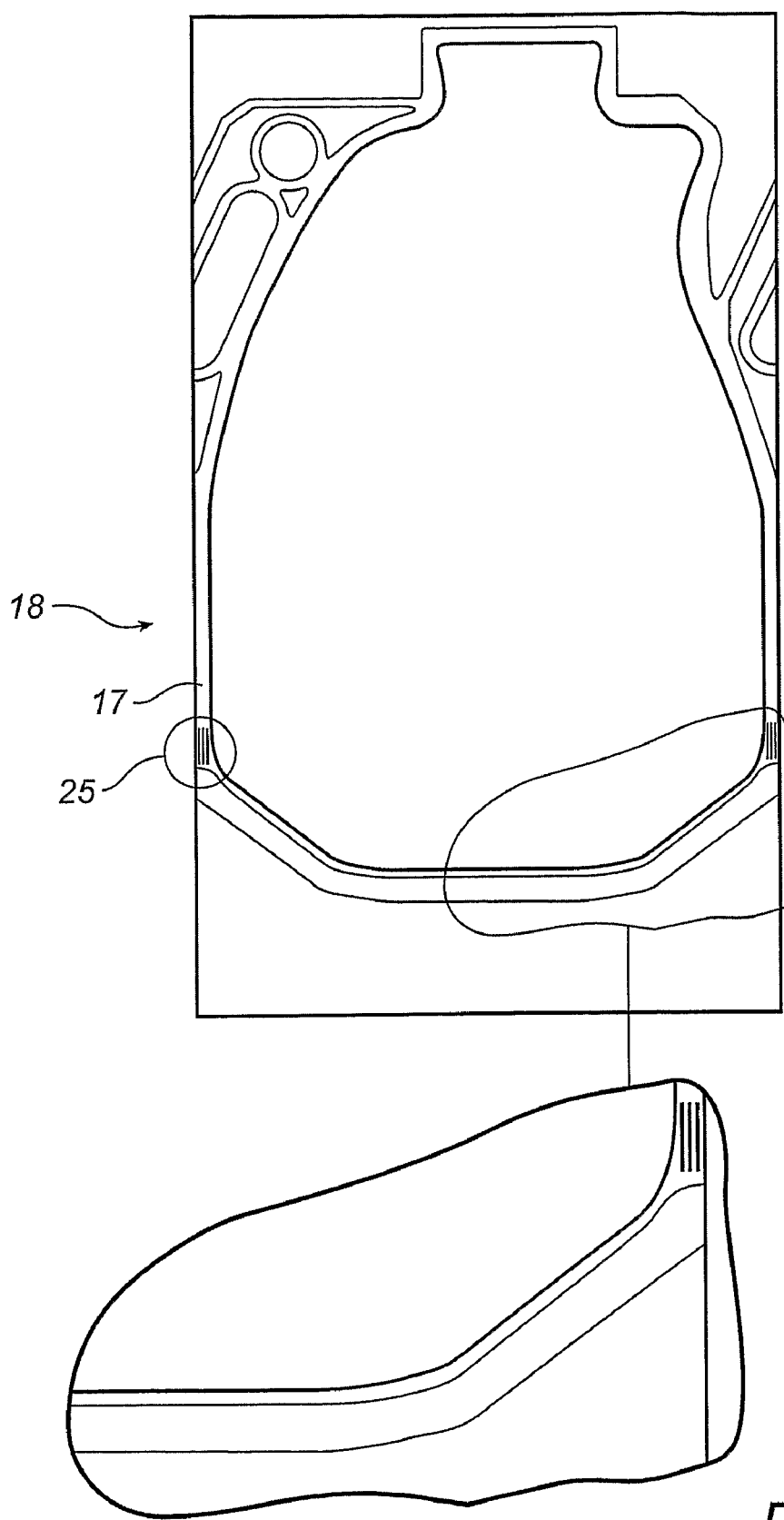
FIG. 7 is a top plan view of a further embodiment of a sealing tool according to the present invention.
Figure 8:
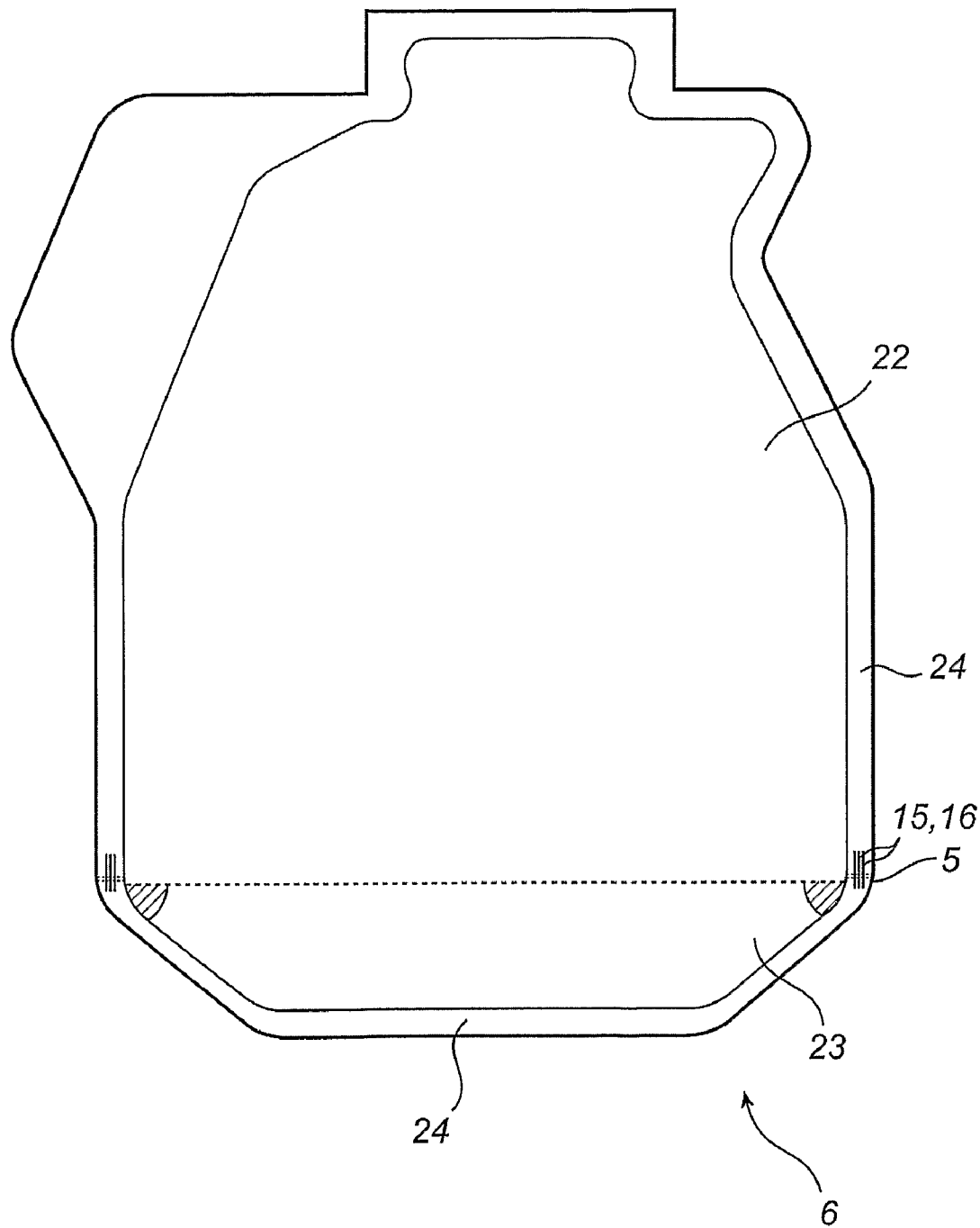
FIG. 8 is a top plan view of a container blank.

For instance, it is possible to let the engaging surface 12 of the sealing tool 10 be included as a section 25 in a profile 17 of a tool 18 shown in FIG. 7 and included in a device for producing a container blank in accordance with that shown in FIG. 8.

In the embodiment shown, the tool 18 of the device is arranged to produce the container blank 6 shown in FIG. 8 from an elongate material web 1 shown in FIG. 1 and comprising layers of material in the form of two opposite and parallel side wall webs 20 and, arranged therebetween, a bottom wall web 21 folded into a double-walled shape, said material web 1 having in the transverse direction a transition 5 from a first layer structure comprising said two side wall webs 20 and said bottom wall web 21 to a second layer structure merely comprising said side wall webs 20.

The container blank 6 made from said material web 1 can have two opposite side walls 22 and a bottom wall 23 folded in two, the container blank 6 obtaining its side walls 22 from the respective side wall webs 20 and its bottom wall 23 from the bottom wall web 21. The walls are interconnected along a connecting portion 24.

For the production of a container blank 6, the profile 17 of the tool 18 is thus applied to the material web 1 to connect opposite surfaces of the wall webs 20, 21 of the material web 1 along said connecting portion 24.

Each section 25 of the profile 17 that is responsible for the making of a seal 9 in a portion 7 of the connecting portion 24, which portion 7 has an extent that intersects a transition 7 of said type in the material web 1, forms an engaging surface 12 in accordance with that described above with reference to the sealing tool 10 shown in FIG. 3.

It will thus be possible to produce container blanks 6 with reliable connecting portions 24, also in the portions 7 that have an extent intersecting a transition 5 of said type. Especially ridges 15 and valleys 16 will be formed in such a portion 7, said ridges 15 and valleys 16 preventing the occurrence of a through duct 8 which would otherwise have made the compartment of the container blanks 6 communicate with the surroundings.

It will further be appreciated that the present invention is not limited to the embodiments shown.

It is thus conceivable to design the inventive device so that the profile of its sealing tool lacks the section with recesses, which instead are formed in an abutment, to which the sealing tool is applicable with the material web arranged therebetween.

It is also possible to design the abutment in the way corresponding to that shown for the sealing tool in FIGS. 3, 4 and 6, whereby two profiles with sections of the type described are brought together with the material web arranged therebetween.

The sealing tool of the inventive device can be arranged to engage the material web under simultaneous movement therewith to allow continuous production of container blanks. It is also conceivable to arrange the sealing tool for stationary engagement with the material web, whereby container blanks are produced in intermittent operation.

Several modifications and variations are thus feasible, which means that the scope of protection of the present invention is exclusively defined by the appended claims.

The invention claimed is:

1. A method for forming a container blank made of a material web, said container blank comprising a first elongate section with four layers of material, wherein a bottom section of said container blank is formed from said first elongate section, said bottom section including a bottom wall folded into a double-walled shape, and a second elongate section with two layers of material, wherein a body section of said container blank is formed from said second elongate section, at least one of said layers of material being included in both the first and the second elongate sections, the method comprising:

providing a seal extending across a portion of the container blank having an extent that intersects a transition from the first elongate section to the second elongate section of the material web by connecting, in said portion, opposite surfaces of the layers of material of the material web to each other, said transition having an elongated length and the portion comprising less than the entire elongated length of the transition, said connecting including:

arranging said portion of the material web between an abutment and a sealing tool, whereby at least one of the abutment or the sealing tool comprises recesses, and whereby a surface of the abutment facing the sealing tool is non-complementary to a surface of the sealing tool facing the abutment, bringing together said abutment and said sealing tool for forming ridges and valleys by moving material in said portion into said recesses, and orienting said ridges and valleys in such a manner that said ridges and valleys have an extent intersecting said transition.

2. The method as claimed in claim 1, wherein said ridges and valleys are formed integrally with the opposite surfaces of the layers of material of the material web being connected to each other in said portion.

3. The method as claimed in claim 1 or 2 wherein the material web is supplied in the form of a plastic material.

4. The method as claimed in claim 1, wherein each ridge is given a triangular cross-section.

5. The method as claimed in claim 1, wherein each ridge is given a cup-shaped cross-section.

6. The method as claimed in claim 1, further comprising the step of supplying the layers of material of the material web in the form of two opposite and parallel side wall webs and, arranged therebetween, a bottom wall web folded into a double-walled shape, the container blank obtaining two opposite side walls from said side wall webs and a bottom wall, folded in two, from said bottom wall web.

7. The method as claimed in claim 1, in which the opposite surfaces of the layers of material of the material web are connected to each other in said portion by a heat sealing process.

* * * * *